US012775502B2

(12) United States Patent

Parnell et al.

(10) Patent No.: US 12,775,502 B2

(45) Date of Patent: Oct. 27, 2026

(54) CROSS CLOUD SERVING

(71) Applicant: INTERNATIONAL BUSINESS MACHINES CORPORATION, Armonk, NY (US)

(72) Inventors: Thomas Parnell, Zurich (CH); Malgorzata Lazuka, Zurich (CH); Andreea Anghel, Adliswil (CH); Parikshit Ram, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 18/488,982

(22) Filed: Oct. 17, 2023

(65) Prior Publication Data

US 2025/0123896 A1 Apr. 17, 2025

(51) Int. Cl.

*G06F 9/44* (2018.01)
*G06F 9/445* (2018.01)
*G06F 9/50* (2006.01)

(52) U.S. Cl.

CPC .......... *G06F 9/505* (2013.01); *G06F 9/44505* (2013.01)

(58) Field of Classification Search

CPC .... G06F 9/505; G06F 9/44505; G06F 9/5044; G06F 2209/501; G06F 9/5072; G06F 9/5077; G06N 7/01; H04L 41/0866; H04L 41/16

USPC .......................................................... 718/105

See application file for complete search history.

(56) References Cited

U.S. PATENT DOCUMENTS

| | | | | |
|---|---|---|---|---|
| 8,838,801 | B2 | 9/2014 | Alapati | |
| 8,887,056 | B2 * | 11/2014 | Breternitz | G06F 9/505 715/750 |
| 9,128,739 | B1 * | 9/2015 | Juels | G06F 9/45558 |
| 10,713,073 | B2 | 7/2020 | Liu | |
| 12,487,862 | B2 | 12/2025 | Lazuka et al. | |
| 2014/0280946 | A1 | 9/2014 | Mukherjee | |
| 2014/0358831 | A1 * | 12/2014 | Adams | G06N 7/01 706/20 |

OTHER PUBLICATIONS

Alipourfard, O. et al. "CherryPick: Adaptively Unearthing the Best Cloud Configurations for Big Data Analytics", NSDI (2017) 14 pgs.

Bilal, M. et al. "Do the best cloud configurations grow on trees? An Experimental Evaluation of Black Box Algorithms for Optimizing Cloud Workloads", VLDB Endowment (2020), vol. 13:11, pp. 2563-2575.

Hsu, C. et al. "An Experienced Guide to Find the Best Cloud Configuration", Arxiv (2018), 13 pgs.

(Continued)

*Primary Examiner* — Timothy A Mudrick

(74) *Attorney, Agent, or Firm* — CHIP LAW GROUP

(57) ABSTRACT

A computer product and methodology for serving a cloud workload across multiple cloud service providers. A first evaluation is performed for a first configuration in a first cloud service of the plurality of cloud services, and a second evaluation is performed for a second configuration in a second cloud service of the plurality of cloud services. A first result of the first evaluation and a second result of the second evaluation are used to select an unevaluated configuration in one of the first and second cloud services for performing another evaluation.

19 Claims, 6 Drawing Sheets

(56) References Cited

OTHER PUBLICATIONS

Hsu, C. et al. "Low-Level Augmented Bayesian Optimization for Finding the Best Cloud VM", arXiv:1712.10081v1 (2017), 11 pgs.
Klimovic, A. et al. "Selecta: Heterogeneous Cloud Storage Configuration for Data Analytics", ATC (2018), 15 pgs.
Lazuka, M. et al. "Search-Based Methods for Multi-Cloud Configuration", IEEE Cloud (2022), 11 pgs.
Li, Y. et al., "Automating Cloud Deployment for Deep Learning Inference of Real-time Online Services", IEEE Infocom (2020), 10 pgs.
Li, B. et al., "Ribbon: Cost-Effective and QoS-Aware Deep Learning Model Inference using a Diverse Pool of Cloud Computing Instances", The International Conference for High Performance Computing, Networking, Storage and Analysis (SC '2021), 16 pgs.
Mariani, G. et al. "Predicting Cloud Performance for HPC Applications Before Deployment", Future Generation Computer Systems (2018), vol. 87, pp. 618-628.
Wang, L. et al. "Morphling: Fast, Near-Optimal Auto-Configuration for Cloud-Native Model Serving", Association for Computing Machinery (2021), 15 pgs.
Yadwadkar, N. J. et al. "Selecting the Best VM Across Multiple Public Clouds: A Data-Driven Performance Modeling Approach", SoCC (2017), 15 pgs.
Casimiro, M. et al., "Lynceus: Cost-efficient Tuning and Provisioning of Data Analytic Jobs", arXiv:1905.02119v2 (2020), 13 pgs.
Zhang, C. et al., "MArk: Exploiting Cloud Services for Cost-Effective, SLO-Aware Machine Learning Inference Serving", USENIX Annual Technical Conference (2019), pp. 1049-1062.
Liu, Y. et al., "Cloud Configuration Optimization for Recurring Batch-Processing Applications", IEEE Transactions on Parallel and Distributed Systems (2023), vol. 34:5, pp. 1495-1507.
Zhang, X. et al., "ResTune: Resource Oriented Tuning Boosted by Meta-Learning for Cloud Databases", SIGMOD (2021), 13 pgs.
Raj, J. et al., "Towards Designing a Self-Managed Machine Learning Inference Serving System in Public Cloud", arXiv:2008.09491v1 (2020), 8 pgs.
AWS. "The total cost of ownership (TCO) of Amazon SageMaker", aws machine learning, Mar. 2020, 5 pages.
Zongheng Yang, "SkyPilot: ML and Data Science on any cloud with massive cost savings", https://medium.com/@zongheng_yang/skypilot-ml-and-data-science-on-any-cloud-with-massive-cost-savings-244189cc7c0f, Nov. 16, 2022, 16 pages.

* cited by examiner

CROSS CLOUD SERVING

BACKGROUND

The present disclosure generally relates to processing cloud workloads, and more particularly but not by way of limitation, to computer devices and methods of serving a cloud workload across multiple cloud services.

SUMMARY

According to an embodiment of the present disclosure, a computer-implemented method is provided for serving a cloud workload across a plurality of cloud services. The method includes performing a first evaluation of a first configuration in a first cloud service of the plurality of cloud services, and performing a second evaluation of a second configuration in a second cloud service of the plurality of cloud services. A first result of the first evaluation and a second result of the second evaluation are used to select an unevaluated configuration in one of the first and second cloud services for performing another evaluation.

In one embodiment, which may be combined with the preceding embodiment, a computer program product is provided for serving a cloud workload across multiple cloud services. The computer program product includes a computer readable storage medium having program instructions embodied therewith. An execution of the program instructions by a processor causes a computing device to perform a first evaluation of a first configuration in a first cloud service of the plurality of cloud services, and to perform a second evaluation of a second configuration in a second cloud service of the plurality of cloud services. A first result of the first evaluation and a second result of the second evaluation are used to select an unevaluated configuration in one of the first and second cloud services for performing another evaluation.

In one embodiment, a computer system is provided for a computer system for serving a cloud workload across multiple cloud services. The computer system includes a processor, a computer-readable memory, a computer-readable tangible storage device, and program instructions stored on the computer-readable storage device for execution by a processor via the computer-readable memory. The computer system is configured to perform a method of performing a first evaluation of a first configuration in a first cloud service of the plurality of cloud services, and performing a second evaluation of a second configuration in a second cloud service of the plurality of cloud services. A first result of the first evaluation and a second result of the second evaluation are used to select an unevaluated configuration in one of the first and second cloud services for performing another evaluation.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
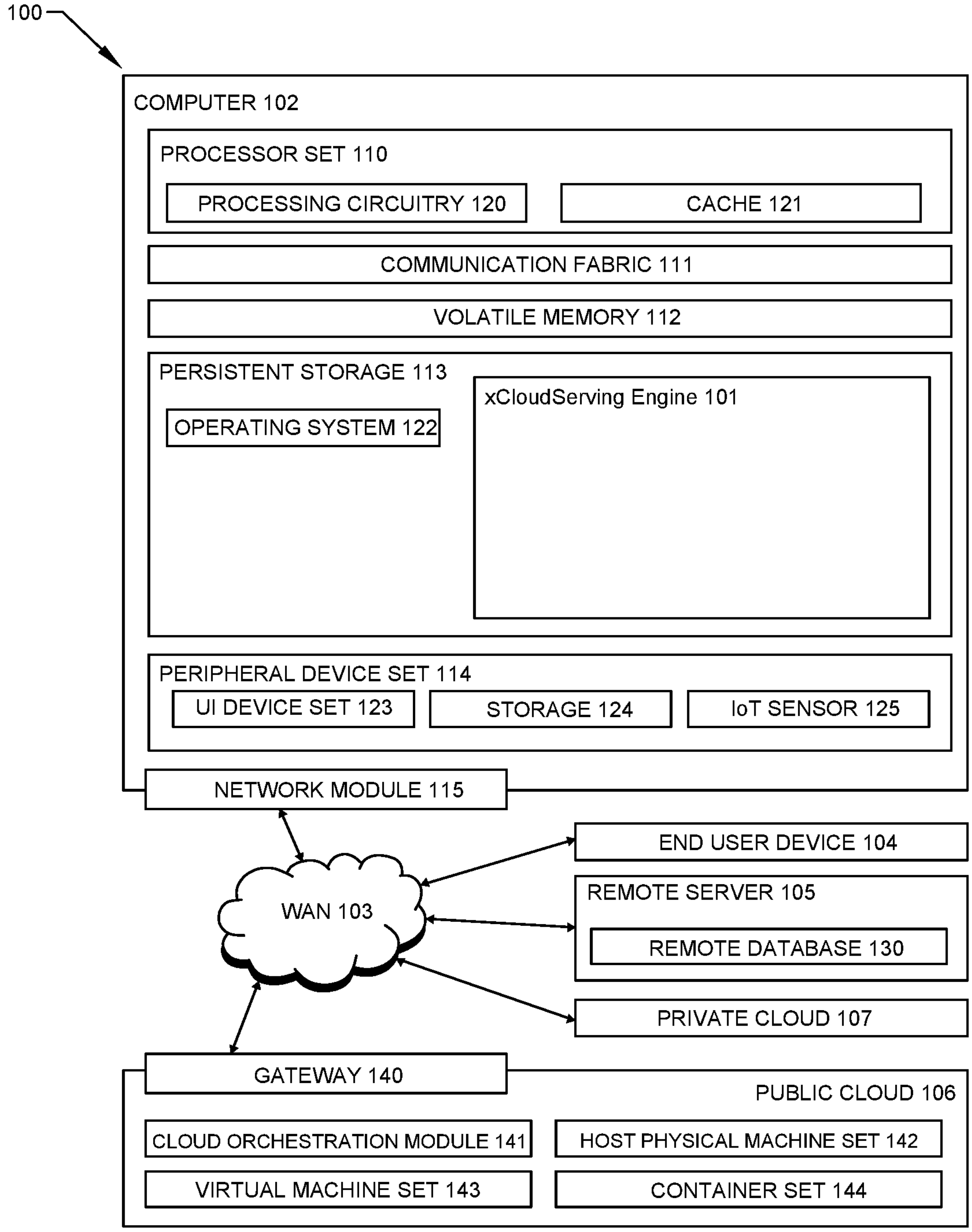
FIG. 1 is a functional block diagram of a computer hardware platform for serving a cloud workload under a tail latency constraint across a plurality of available cloud services, consistent with illustrative embodiments.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

To better understand the features of the present disclosure, it may be helpful to discuss known architectures. To that end, the following detailed description illustrates various aspects of the present disclosure by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 includes an example of an environment for the execution of at least some of the computer code involved in performing the inventive methods, including a xCloudServing block 101. In addition to block 101, computing environment 100 includes, for example, computer 102, wide area network (WAN) 103, end user device (EUD) 104, remote server 105, public cloud 106, and private cloud 107. In this embodiment, computer 102 includes processor set 110 (including processing circuitry 120 and cache 121), communication fabric 111, volatile memory 112, persistent storage 113 (including operating system 122 and block 101, as identified above), peripheral device set 114 (including user interface (UI) device set 123, storage 124, and Internet of Things (IoT) sensor set 125), and network module 115. Remote server 105 includes remote database 130. Public cloud 106 includes gateway 140, cloud orchestration module 141, host physical machine set 142, virtual machine set 143, and container set 144.

COMPUTER 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 102 to cause a series of operational steps to be performed by processor set 110 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 101 in persistent storage 113.

COMMUNICATION FABRIC 111 is the signal conduction path that allows the various components of computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 102, the volatile memory 112 is located in a single package and is internal to computer 102, but, alternatively or additionally, the volatile memory may be distributed over multiple packages and/or located externally with respect to computer 102.

PERSISTENT STORAGE 113 is any form of non-volatile storage for computers that is now known or to be developed in the future. The non-volatility of this storage means that the stored data is maintained regardless of whether power is being supplied to computer 102 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 101 typically includes at least some of the computer code involved in performing the inventive methods.

PERIPHERAL DEVICE SET 114 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 102 to communicate with other computers through WAN 103. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 102 from an external computer or external storage device through a network adapter card or network interface included in network module 115.

WAN 103 is any wide area network (for example, the internet) capable of communicating computer data over non-local distances by any technology for communicating computer data, now known or to be developed in the future. In some embodiments, the WAN 103 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 104 is any computer system that is used and controlled by an end user (for example, a customer of an enterprise that operates computer 102), and may take any of the forms discussed above in connection with computer 102. EUD 104 typically receives helpful and useful data from the operations of computer 102. For example, in a hypothetical case where computer 102 is designed to provide a recommendation to an end user, this recommendation would typically be communicated from network module 115 of computer 102 through WAN 103 to EUD 104. In this way, EUD 104 can display, or otherwise present, the recommendation to an end user. In some embodiments, EUD 104 may be a client device, such as thin client, heavy client, mainframe computer, desktop computer and so on.

REMOTE SERVER 105 is any computer system that serves at least some data and/or functionality to computer 102. Remote server 105 may be controlled and used by the same entity that operates computer 102. Remote server 105 represents the machine(s) that collect and store helpful and useful data for use by other computers, such as computer 102. For example, in a hypothetical case where computer 102 is designed and programmed to provide a recommendation based on historical data, then this historical data may be provided to computer 102 from remote database 130 of remote server 105.

PUBLIC CLOUD 106 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 106 is performed by the computer hardware and/or software of cloud orchestration module 141. The computing resources provided by public cloud 106 are typically implemented by virtual computing environments that run on various computers making up the computers of host physical machine set 142, which is the universe of physical computers in and/or available to public cloud 106. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 106 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 107 is similar to public cloud 106, except that the computing resources are only available for use by a single enterprise. While private cloud 107 is depicted as being in communication with WAN 103, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 106 and private cloud 107 are both part of a larger hybrid cloud.

The computer 102 is in some embodiments a server. The remote server 105 in some embodiments represents multiple servers which can provide probabilistic modeling resources and/or computer memory resources for the computer 102 and the xCloudServing block 101. Probabilistic modeling can include machine learning resources and methods, although not necessarily so.

"Machine learning" broadly describes a function of an electronic system that learns from data. A machine learning system, engine, or module can include a trainable machine learning algorithm stored in computer memory that can be trained, such as in an external cloud environment, to learn functional relationships between inputs and outputs that are currently unknown.

Machine learning can be utilized to solve a variety of technical issues (e.g., learning previously unknown functional relationships) in connection with technologies such as, but not limited to, machine learning technologies, time-series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies.

Accordingly, the computer 102 has a specialized processing unit such as the xCloudServing block 101 and the like for carrying out computations related to cross cloud serving. More particularly, without limitation, the specialized processing unit automatically and consistently deploys a cloud workload across multiple cloud service providers (or "cloud services"). The computer system is thereby specifically configured to provide technical improvements to data systems, modeling systems, artificial intelligence systems, and systems of data analysis systems such as but not limited to data classification systems, data regression systems, data clustering systems, and the like. The ML output can further provide one or more inferences, provide one or more predictions, and/or determine one or more relationships among the data. For example, cross cloud serving as described herein may model one or more inferences and/or predictions and/or may determine one or more relationships amongst the variables analyzed in the data. A model is produced for predicting outputs, e.g., probabilities, at factual (historical) action values from a training dataset of historical data. The model that is optimized is, however, far more accurate and efficient than traditional approaches to serving cloud workloads. Thus, the model optimization that is produced helps with downstream decision making, even with such downstream decision making that is automated.

The computational resources can employ any suitable techniques, such as statistical-based techniques and/or probabilistic-based techniques. For example, the computational resources can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, and the like. For example, the computational resources can perform a set of clustering computations, a set of logistic regression computations, a set of decision tree computations, a set of random forest computations, a set of regression tree computations, a set of least square computations, a set of instance-based computations, a set of support vector regression computations, a set of k-means computations, a set of spectral clustering computations, Gaussian mixture model computations, a set of regularization computations, a set of rule computations, a set of Bayesian computations, a set of deep Boltzmann computations, a set of deep belief network computations, a set of convolution neural network computations, a set of stacked auto-encoder computations and/or a set of different computations.

Accordingly, the distributed computing system generally facilitates optimizing cross cloud serving predictions in accordance with one or more embodiments illustratively described herein. For example, the optimizations can be related to a ML system, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system. The system can employ hardware and/or software to solve problems that are highly technical in nature, that are not abstract and that cannot be performed as a set of mental acts by a human.

For simplicity of explanation, the specialized-computer-implemented methods are depicted and described as a series of acts. It is to be understood and appreciated that the subject innovation is not limited by the acts illustrated and/or by the order of acts. That is, for example, acts can occur in various orders and/or concurrently, and with other acts not presented and described herein. Furthermore, not all expressly disclosed acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from a computer-readable device or storage media.

The system can employ hardware and/or software to solve problems that are highly technical in nature, that are not abstract and that cannot be performed as a set of mental acts by a human. One or more embodiments of the system can also provide technical improvements to a computer processing unit by improving processing performance of the computer processing unit, reducing computing bottlenecks of the computer processing unit, improving processing efficiency of the computer processing unit, and/or reducing an amount of time for the computer processing unit to perform the computational processes.

Figure 2:
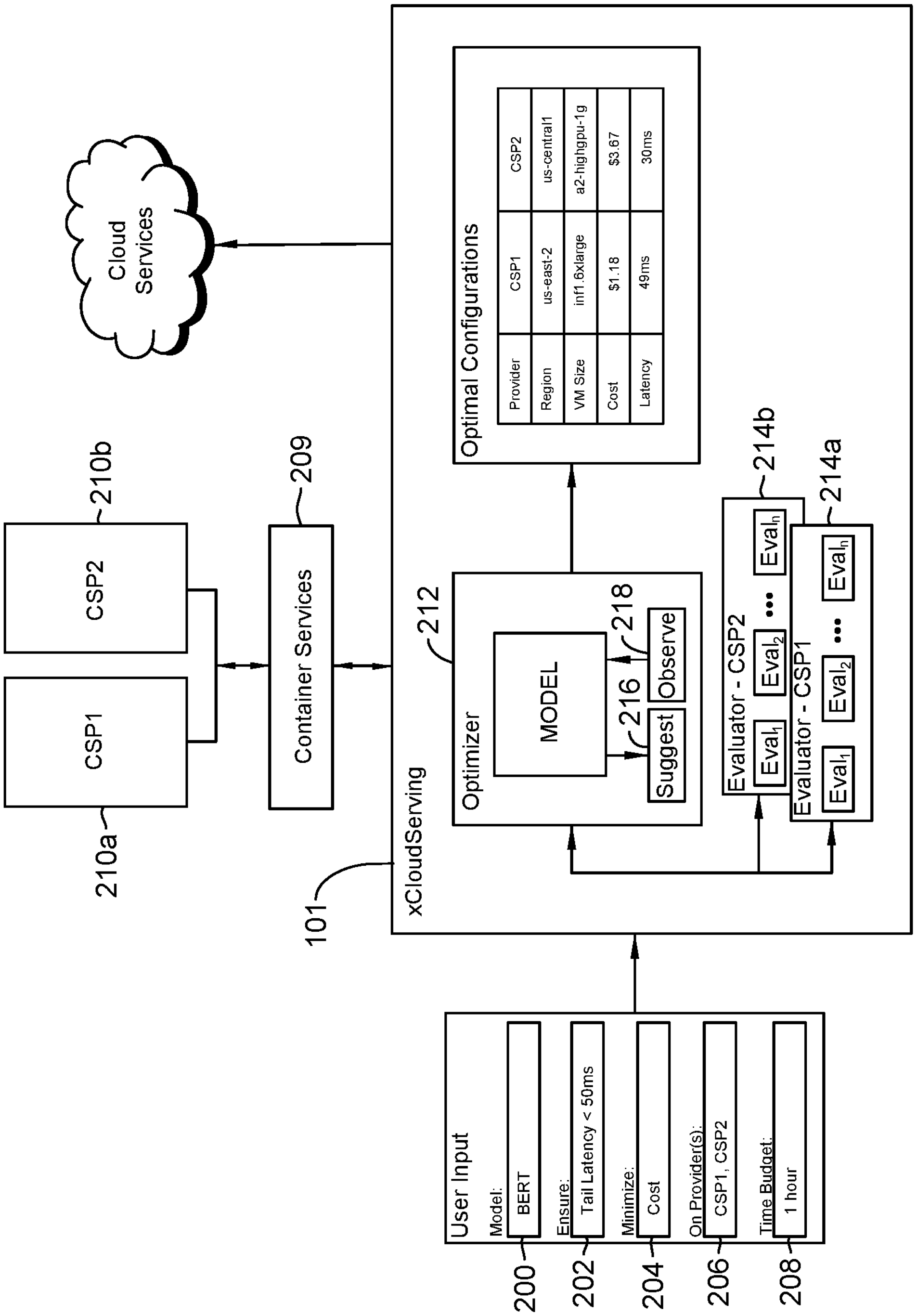
FIG. 2 is a conceptual block diagram of the cross cloud serving ("xCloudServing") block in the computer hardware platform in FIG. 1, consistent with illustrative embodiments.

FIG. 2 depicts an exemplary high-level conceptual overview of the xCloudServing block 101 in FIG. 1. As probabilistic models have grown in complexity, so too have the expenses they incur when deployed in the cloud. To reduce the computational overhead associated with serving a cloud workload, it is necessary to optimize the choice of cloud infrastructure used. Additionally, the chosen infrastructure should be able to deliver on the latency constraints that are typically defined for cloud services. This problem is made more challenging since today's organizations often work with more than one cloud provider, and each provider offers its own unique set of interfaces and infrastructure choices. The xCloudServing block 101 provides consistent and automated deployment of inference services across multiple cloud providers and regions. And illustrative embodiments of this disclosure do so by upholding the valuable business principle of minimizing computational overhead whilst satisfying tail latency constraints.

As the number of applications powered by probabilistic modeling has grown, so too have the associated infrastructure needs. Many organizations turn to public cloud providers for their computational infrastructure since, relative to on-premises solutions, the cloud offers increased flexibility, ease of maintenance, and the ability to scale rapidly. The computational overhead of putting models into production to serve inference requests on unseen data can significantly surpass the computational overhead of training the models. And this typically increases with the size of the organization. Thus, tools for reducing the computational overhead of serving a cloud workload can significantly benefit cloud consumers today.

Another industry trend is the increasing number of organizations working with more than one cloud provider. This trend can be attributed to a variety of different factors including regulatory compliance, mergers and acquisitions, the ability to leverage proprietary services and hardware, and simply the desire to avoid vendor lock-in. By building applications on top of services that are offered across cloud providers, organizations gain the ability to build once, deploy anywhere.

The user's goal is to deploy a given model across one or more cloud service providers whilst ensuring that the deployment is as inexpensive as possible, such as by satisfying the terms of a service level agreement ("SLA"). As shown in FIG. 2, user input to the xCloudServing block 101 in these illustrative embodiments can include a model 200, the tail latency constraint 202, an optimization factor (e.g., cloud service provisioning cost) 204, one or more regional cloud service providers 206, and the time budget 208 for the optimization. Upon a platform of container services 208, the xCloudServing block 101 can create clusters 210*a*, 210*b* for the cloud service providers 206 selected by the user. The clusters 210 can be located in different regions within the same cloud, or they can reside on different clouds entirely.

Figure 3:
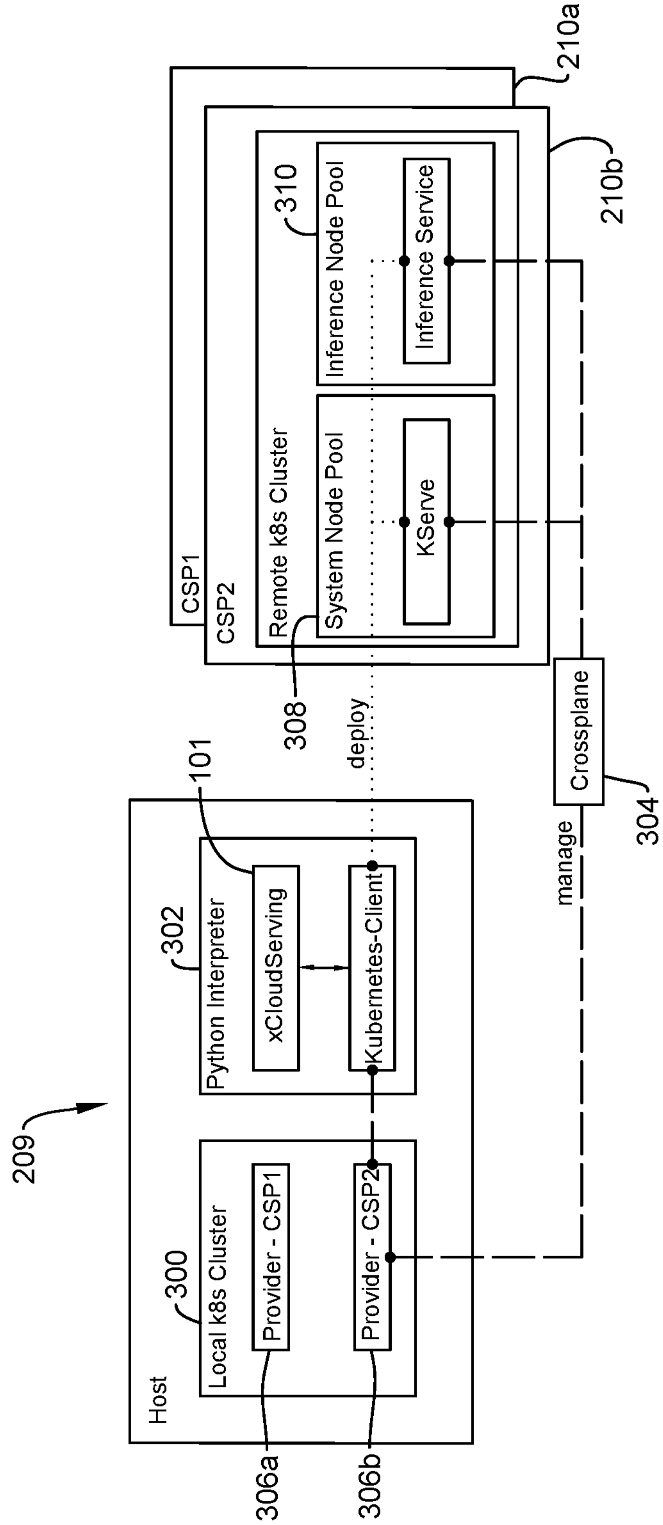
FIG. 3 is a conceptual block diagram of a xCloudServing block operating environment, consistent with illustrative embodiments.

FIG. 3 depicts a conceptual block diagram of a container services 209 operating environment in accordance with illustrative embodiments. For example, major public cloud providers offer some form of managed Kubernetes® (k8s) services. This generally allows an application to be deployed to a k8s cluster across a variety of different clouds. In practice however, each cloud service provider 206 uses its own set of command line interfaces ("CLIs") and software development kits ("SDKs"). Thus, managing the lifecycle of k8s-based applications across different cloud providers can incur provider-specific management overheads.

These challenges have led to the emergence of open-source projects like Crossplane® which introduce new abstractions allowing one to manage cloud infrastructure across different providers in a consistent and k8s-native manner. Cloud interface technology like this enables organizations working with more than one cloud to build multi-cloud k8s control planes that can scale easily to a large number of providers. When creating k8s clusters, a virtual machine (VM) type can be selected that will be associated with each node within the cluster. Cloud consumers can choose from a wide range of VM types available within the region in which the cluster is hosted, and their choice will heavily impact the deployment computational overhead. In the multiple cloud setting, the problem is complicated by the fact that each provider offers a large, heterogeneous set of VM types. While there may be some commonalities in how these VM types are parameterized, each cloud service provider 206 offers a range of VM families that map to different underlying hardware, resulting in different performance of the cloud service.

Moreover, inference services are typically governed by the SLA that specifies a constraint on the latency, or throughput. Therefore, when selecting the VM type for serving a cloud workload, not only should the VM type be as inexpensive as possible, but the inference service should satisfy the SLA as well. If a very inexpensive, weak VM is selected, it may not have enough resources to deliver on the latency SLA. Conversely, if a very expensive, powerful VM is selected, it may be massively overprovisioned and incur unnecessary computational overhead. The xCloudServing block 101 automatically and consistently avoids such pitfalls in the deployment of a cloud workload across different cloud service providers.

In these illustrative embodiments, the xCloudServing block 101 can be implemented in Python, with dependencies on k8s, Crossplane and KServe services. A local k8s cluster 300 can be deployed on a host machine, such as the specialized computer 102 in FIG. 1. The xCloudServing block 101 can interact with the local k8s cluster 300 programmatically via a k8s Python client 302. In order to manage the lifecycle of remote k8s clusters 210, the xCloudServing block 101 can leverage Crossplane 304, which can be installed into the local k8s cluster 300. A set of Crossplane providers 306 can be installed corresponding to each cluster 210 to be used. Each provider 306 can define a set of k8s custom resource definitions ("CRDs"), which can be used to manage cloud infrastructure. The xCloudServing block 101 can then interact directly with the remote cluster 210 via the k8s python client. The remote cluster 210 can be partitioned into a system node pool 308 and an inference node pool 310. The system node pool 308 can be created once on each cluster 210 when the xCloudServing block 101 is initialized, and it remains unchanged throughout the optimization. It is responsible for running the Kserve controller and all of its dependencies. Kserve provides a standardized protocol for serving models using a wide variety of frameworks (e.g., Tensorflow®, PyTorch®, XGBoost, LightGBM) and inference runtimes (e.g., TFServing, TorchServe, NVIDIA Triton).

To deploy the model to serve client requests, the xCloudServing block 101 can create a new Inference Service (a CRD defined by Kserve). This service is registered with the Kserve controller and creates a set of k8s pods. Each pod includes a replica of the model and resides on one of the nodes of the inference node pool 310. Each client request sent to the service is routed to one of these pods, which is responsible for computing the model predictions. The corresponding response is then delivered back to the client. Over the course of optimization, the xCloudServing block 101 will add and remove inference node pools with different VM types using the corresponding CRDs provided by the Crossplane providers.

The optimization is performed using a search-based approach. On each cluster 210, in parallel, the xCloudServing block 101 iteratively evaluates different configurations, such as VM types, to verify whether they satisfy the tail latency constraint 202. Finally, the xCloudServing block 101 returns the least expensive valid configuration discovered within each cluster. A valid configuration is defined to be one that satisfies the SLA. Latency is defined as the time between the client sending a request and receiving a response. The user can then use the xCloudServing block 101 to deploy their model to one or all these clusters 210.

Although in these illustrative embodiments the xCloudServing block 101 optimizes the overhead of a single-node deployment, the number of nodes can be adapted dynamically such as based on the rate of requests arriving at the service. Managed k8s services offer various autoscaling features that allow the number of nodes to be scaled up and down based on both long-term trends (e.g., the number of clients is gradually increasing), as well as short-term trends (e.g., the rate of requests peaks during business hours). Therefore, once the optimization is finished, the xCloudServing block 101 can deploy the service(s) with autoscaling enabled. The number of nodes (and thus, computational overhead) at any given time will be dictated by autoscaling but the xCloudServing block 101 ensures that each node can meet the SLA, and that the configuration of the nodes is as cheap as possible.

Returning to FIG. 2, the xCloudServing block 101 has an optimizer 212 that enforces the user-defined optimization time budget 208. Within the main optimization process, an algorithm instance is created, and evaluator 214 sub-processes are spawned for each cluster 210. A suggest function 216 of the algorithm can be called once for each cluster 210, returning an initial configuration, which can be placed in the input queue of the corresponding evaluator 214.

Figure 4:
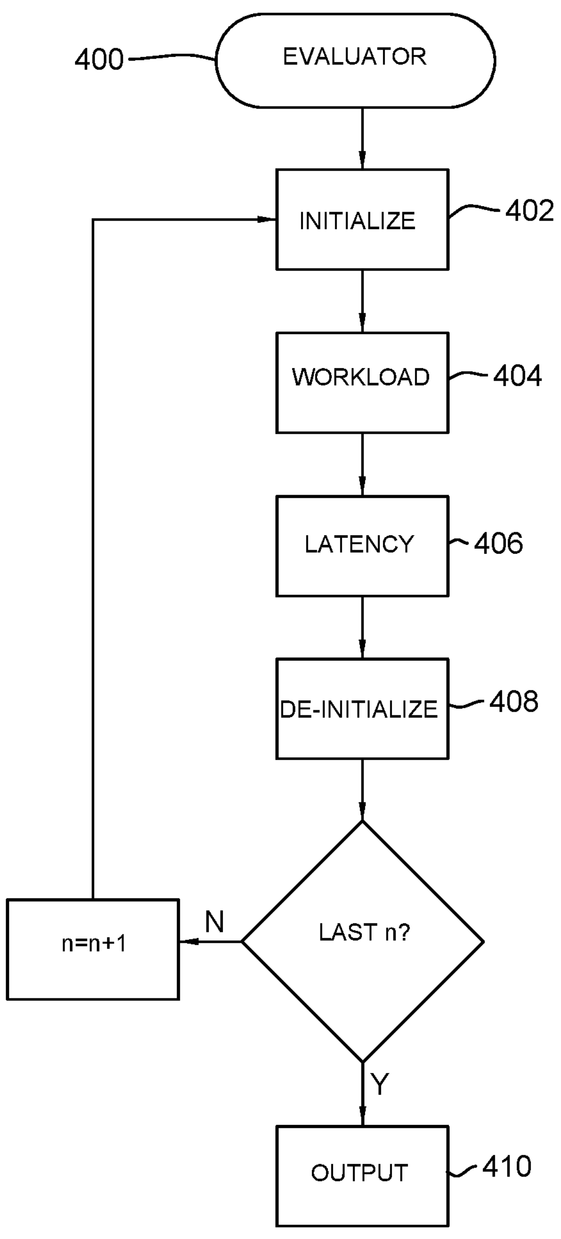
FIG. 4 is a flowchart depicting steps in a method performed by the evaluator in the xCloudServing block, consistent with illustrative embodiments.

The evaluators 214 can operate asynchronously in parallel. Each evaluator 214 can continuously pull from its input queue and once it receives a new configuration, it evaluates the latency of the cloud service deployed using this configuration on its cluster 210. FIG. 4 is a flowchart depicting steps in a method 400 performed by the evaluator 214, according to illustrative embodiments. To begin, the evaluator 214 can initialize in block 402 by performing a sequence of function calls on its cluster instance. For example, it can create a new inference node pool 310 on the remote cluster 210. In this example of employing a single node with the specific VM type, the evaluator 214 can disable autoscaling. Further, the initialization in block 402 can include creating a new inference service ensuring that only one pod is used, the pod gets deployed to the newly created node, the pod uses all available memory and (integer) CPU on the node, and limits are set equal to resources to ensure that the pod receives the guaranteed quality of service class from k8s.

Upon the successful initialization in block 402, the evaluator 214 can then deploy a workload generator job in block 404 that sequentially sends a large number of requests to the selected cloud service(s) 206. The generator can be deployed to the system node pool 308 so that the latency is measured from within the same data center. In block 406, the resulting latency statistics can be returned and appended to list stats. Upon completion of the latency (or "performance") analysis, in block 408 the evaluator 214 can then de-initialize, such as by deleting the inference node pool 310 and the inference service. The above steps can then be repeated n times to account for various nondeterministic effects observed when provisioning VMs in the cloud. Once all n repetitions have been performed, the resulting statistics can be pushed into an output queue in block 410.

Returning to FIG. 2, a single output queue can accumulate statistics from all the evaluators 214. The optimizer 212 can continuously pull from this queue, and thereby parse the statistics to estimate the tail latency. The tail latency for each of the n repetitions can be computed, and then the maximum latency used to account for the worst case. The optimizer 212 then determines if the VM type was valid and if so, it can look up its cost 204 in the respective cloud provider's pricing tables. The optimizer 212 can keep track of the least expensive valid VM type for each cluster 210, and can thereby determine whether the received VM type is both valid and more computationally efficient than the current best for the corresponding cluster 210.

If the tail latency estimation is successful, the estimate can be sent to an algorithm by calling the observe function 218, additionally passing the cluster index and VM type as arguments. Depending on the implementation of the algorithm, this may trigger the algorithm to update any internal state. Once the algorithm is finished observing a result from a given cluster index, or if there was no successful result to observe, the suggest function 216 can call for the same cluster index, and the suggested VM type can be pushed into the corresponding input queue. When the optimization time budget is exhausted, the optimizer 212 can trigger a graceful termination of the evaluator subprocesses, such as by ensuring that all inference node pools are properly deleted.

Various optimization algorithms can be employed within the xCloudServing block 101, such that the contemplated embodiments are not limited to the illustrative embodiments expressly or implicitly disclosed herein. Generally, the user can specify n clusters 210 defined as cloud service provider and region pairs to be considered by the optimizer 212, in view of the user-defined tail latency constraint Lmax 202 defined in the SLA. In this illustrative example, Xi can denote the set of all VM types available in the cloud service provider and region associated with cluster i, and let $$X = \bigcup_{i=1..n} X_i.$$

The optimizer 212 aims to solve the following n parallel optimization problems:

$$\min_{x \in X_i} c_i(x) \text{s.t. } l_i(x) \le L_{max} \forall_{i \in [1..n]} \tag{1}$$

where $c_i, l_i: X_i \rightarrow \mathbb{R}_+$ denote the cost 204 per node and the tail latency constraint 202 of VM type $x \in Xi$, respectively. An assumption can be made that on-demand nodes are used, and that the cost is known a-priori (e.g., from pricing tables of the cloud service provider). The algorithms for solving (1) can adhere to a suggest and observe API. Through suggest function 216 the algorithm suggests which VM type should be evaluated next, and through observe 218 it receives the tail latency measurement for the suggested VM type. The variables $\dot{X}_i \subseteq X_i$ and $\overline{X}_i \subseteq X_i$, respectively, can denote the sets of all unevaluated and all evaluated VM types from cluster i. These sets change throughout the optimization every time observe 218 is called.

Figure 5:
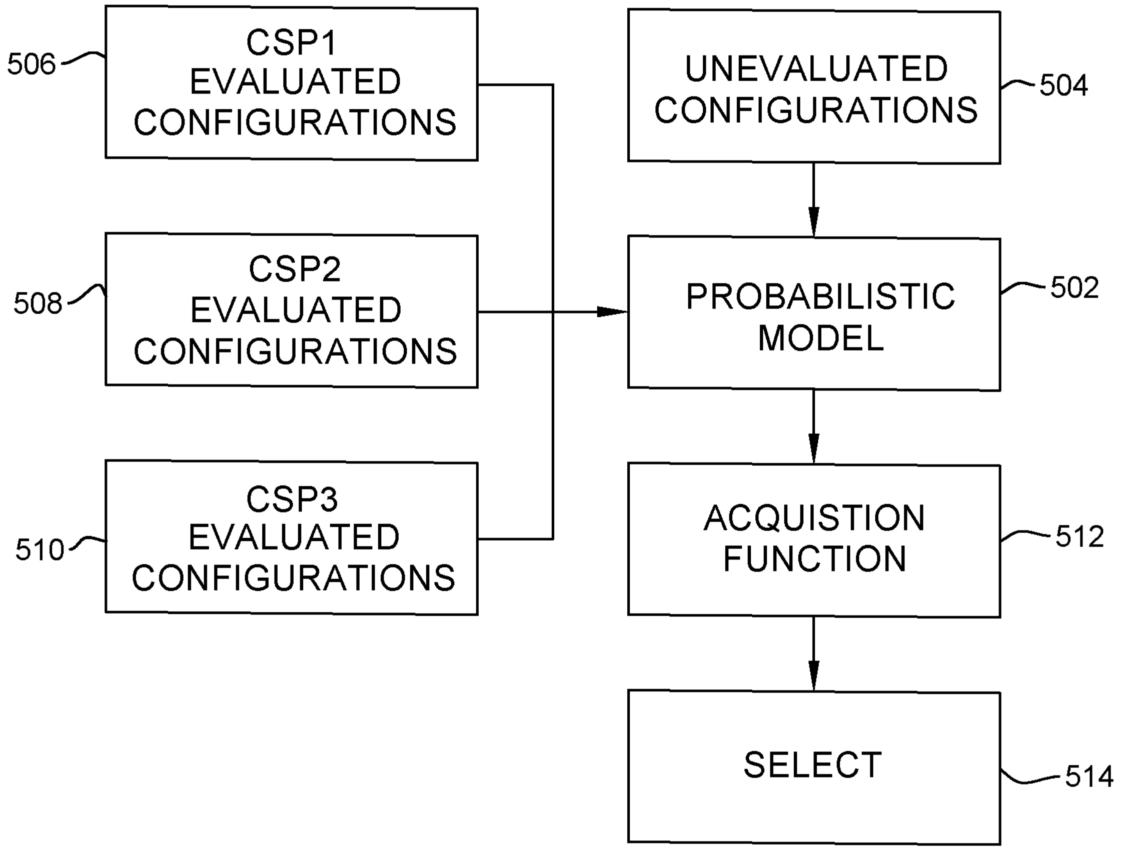
FIG. 5 is a conceptual block diagram depicting the xCloudServing block suggesting a next unevaluated configuration, which is based on the results of previous evaluations across multiple cloud service providers ("CSPs"), consistent with illustrative embodiments.

A distinguishing feature of the claimed embodiments is that they build GP surrogate models using tail latency measurements from all clusters. FIG. 5 conceptually depicts illustrative embodiments of training the probabilistic model in block 502 not only with the results of evaluating the remaining unevaluated configurations 504, but also with the results of evaluating previously evaluated configurations in three cloud service providers 506, 508, 510. In this manner, a first evaluation can be performed of a first configuration in CSP1 and a second evaluation can be performed of a second configuration in CSP2 and a third evaluation can be performed of a third configuration in CSP3. A first result of the first evaluation in CSP1 and a second result of the second evaluation in CSP2 and a third result of the third evaluation in CSP3 are used to train the probabilistic model 502. Thus, the first result of the first evaluation and the second result of the second evaluation and the third result of the third evaluation are used in selecting the next unevaluated configuration 504 for evaluation in one of the cloud service providers CSP1, CSP2, CSP3. If a certain configuration from a cluster CSP1, CSP2, CSP3 is invalid, a configuration with similar or worse characteristics (e.g., fewer vCPUs and/or less memory) in a different cluster is likely to be invalid as well. Thus, sharing information across clusters can lead to more accurate tail latency predictions and faster convergence.

In some embodiments, a plurality of different evaluations is performed in at least one of the first evaluations in CSP1 and the second evaluations in CSP2 and the third evaluations in CSP3. In some embodiments, a plurality of different evaluations is performed in each of the first evaluations in CSP1 and the second evaluations in CSP2 and the third evaluations in CSP3.

At each observe call from cluster i, a single, global tail latency GP model 502 can be updated, which models the tail latency li(x) as a random variable $\tilde{l}_i(x)$. The GP model 502 takes as input all tail latency observations $l_j(X_j)$, j∈[1 . . . n] across all clusters CSP1, CSP2, CSP3. As output, GP provides the posterior distributions for all i∈[1 . . . n] and x∈$X_i$:

$$\tilde{l}_i(x) \mid l_i(\overline{X}_1), l_2(\overline{X}_2), \ldots l_n(\overline{X}_n) \sim \mathcal{N}(\mu_i(x), \sigma_i^2(x))) \quad (2)$$

Performance predictions from the probabilistic model 502 are used as inputs to an acquisition function 512. The acquisition function 512 can be maximized using the input performance predictions to select the next unevaluated configuration for evaluation 514. After that next unevaluated configuration is evaluated, then the results of that evaluation are also used to retrain the probabilistic model 502.

Figure 6:
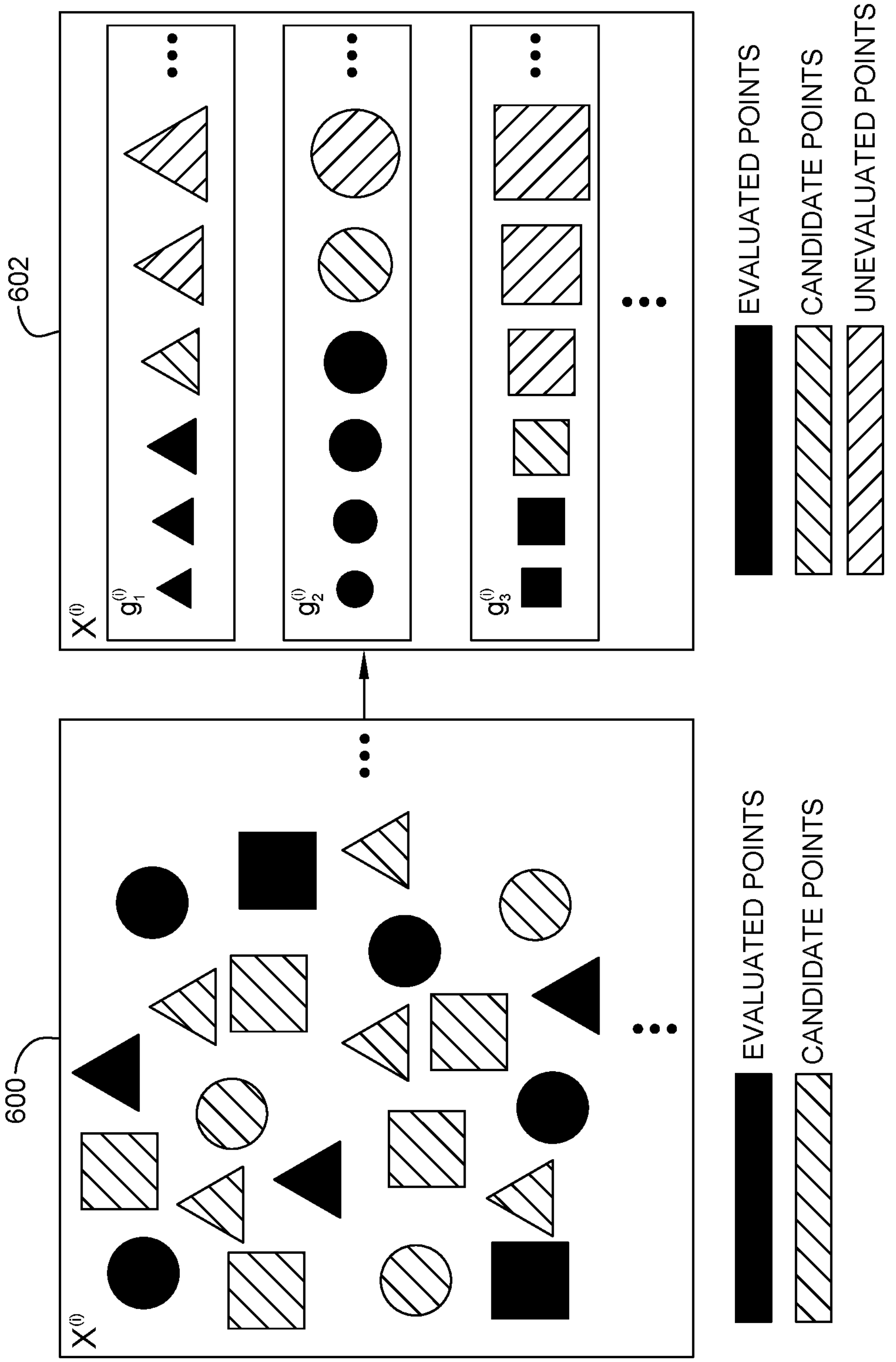
FIG. 6 is a conceptual block diagram depicting the xCloudServing block dividing the available configurations in a cloud service into a plurality of subsets based on hardware configurations and ranking the available configurations in each subset according to cost.

FIG. 6 diagrammatically depicts an unordered set of candidate configurations 600, in this example VM types, in one of the cloud service providers. In such a universal approach, there is no logical grouping or sorting of the different VM types. So, at each suggest call, the next VM type is chosen from among all unevaluated VM types in the domain of a given cloud service provider, $X^{(i)}$, as input to the acquisition function 512. In the early stage of optimization, the probabilistic model 502 is not accurate, so that a significant amount of optimization budget 208 can be wasted evaluating expensive configurations that do not meet the latency constraint 202.

In contrast, during initialization, the present embodiments 602 can partition the domain $X^{(i)}$ of all VM types from cluster i into K subsets $g_{i,k}$, k∈[1 . . . K] with similar VM types. In other embodiments the subsets can be based on other hardware characteristics, e.g., processor arrangement such as number of vCPUs and the like, and/or data storage memory arrangement such as amount of memory and the like. In some embodiments the subsets $g_{i,k}$ can be based on a mixture of different hardware characteristics, such as one subset based on VM type and another subset based on processor arrangement.

Thus, the acquisition function 512 can be maximized using the input performance predictions to select one of the designated subsets $g_{i,k}$ from which to select the next unevaluated configuration. In illustrative embodiments, the next unevaluated configuration for evaluation can then be selected as the one in the selected subset having the lowest user cost. For example, let $\dot{g}_{i,k}$ denote the set of all unevaluated VM types from subset $g_{i,k}$. At each suggest call, the candidate set $C_i$ can be defined as the cheapest unevaluated VM types from each subset $g_{i,k}$:

$$C_i = \begin{cases} \operatorname{argmin} c_i(x), \; k \in [1 \,..\, K] \\ x \in \dot{g}_{i,k} \end{cases}$$

This definition of $C_i$ leads to the VM types within each subset being evaluated in order of ascending cost 204. FIG. 6 depicts the order of increasing user cost in terms of increasing symbol sizes for the VM types in each of the subsets $g_{i,k}$.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

It is to be appreciated that the computer system (e.g., the specialized computer 102, the xCloudServing block 101, and/or the processing resources) performs acts in optimizing cross cloud ML serving that cannot be performed by a human (e.g., is greater than the capability of a single human mind). For example, an amount of data processed, a speed of processing of data and/or data types of the data processed over a certain period of time can be greater, faster and different than an amount, speed and data type that can be processed by a single human mind over the same period of time. The computer system can also be fully operational towards performing one or more other functions while also performing the above-referenced cross cloud serving. Moreover, modeling output generated by computer system can include information that is impossible to obtain manually by a user. For example, an amount of information included in the model output and/or a variety of information included in the model output can be more complex than information obtained manually by a user.

Moreover, because at least cross cloud serving is established from a combination of electrical and mechanical components and circuitry, a human is unable to replicate or perform processing performed by the computer system (e.g., specialized computer 102, the xCloudServing block 101, resources) disclosed herein. For example, a human is unable to communicate data and/or process data associated with the xCloudServing block 101 for a given downstream task. Furthermore, a human is unable to optimize serving across clouds under terms of latency constraints.

Additionally, the specialized computer 102 significantly improves the operating efficiencies of the computer system by deriving constrained probability models in response to a downstream task. Transmitting custom-tailored probability functions as disclosed herein intentionally and significantly eliminates the need to transmit large volumes of historical data. This frees up computer system processing overhead and storage capacities to attend to more important processes, generally reducing the overall computational overhead.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for serving a cloud workload across a plurality of cloud services, the computer-implemented method comprising:

performing, by a processor of a computer system, a first evaluation of a first configuration in a first cloud service of the plurality of cloud services;

performing, by the processor, a second evaluation of a second configuration in a second cloud service of the plurality of cloud services;

training, by the processor, a probabilistic model with training data comprising first performance data and second performance data, wherein the first performance data is obtained from the performing of the first evaluation, the second performance data is obtained from the performing of the second evaluation, the first performance data comprises a first tail latency associated with the first configuration in the first cloud service, and the second performance data comprises a second tail latency associated with the second configuration in the second cloud service;

selecting, by the processor and based on the trained probabilistic model, an unevaluated configuration in one of: the first cloud service or the second cloud service;

performing, by the processor, a third evaluation of the selected unevaluated configuration; and retraining, by the processor, the trained probabilistic model with a result of the third evaluation of the selected unevaluated configuration.

2. The computer-implemented method of claim 1, further comprising:

performing a fourth evaluation of a fourth configuration in a fourth cloud service of the plurality of cloud services; and selecting, based on the first evaluation, the second evaluation, and the fourth evaluation, the unevaluated configuration in one of: the first cloud service, the second cloud service, or the fourth cloud service for performing a fifth evaluation.

3. The computer-implemented method of claim 1, further comprising performing a plurality of different evaluations in at least one of: the performing the first evaluation or the performing the second evaluation.

4. The computer-implemented method of claim 1, further comprising performing a plurality of different evaluations in each of the performing the first evaluation and the performing the second evaluation.

5. The computer-implemented method of claim 1, further comprising:

selecting the unevaluated configuration based on performance predictions from the trained probabilistic model as inputs to an acquisition function.

6. The computer-implemented method of claim 5, further comprising maximizing the acquisition function using the performance predictions to select the unevaluated configuration.

7. The computer-implemented method of claim 6, further comprising:

defining two or more subsets of a plurality of subsets of configurations in at least one cloud service of the plurality of cloud services; and maximizing the acquisition function using the performance predictions to select a subset of the plurality of subsets from which to select the unevaluated configuration.

8. The computer-implemented method of claim 7, wherein the plurality of subsets is based on hardware characteristics.

9. The computer-implemented method of claim 8, wherein the hardware characteristics are selected from a group consisting of virtual machine type, processor arrangement, and data storage memory arrangement.

10. The computer-implemented method of claim 9, wherein the at least one cloud service of the plurality of cloud services has a first subset based on virtual machine type and a second subset based on processor arrangement.

11. The computer-implemented method of claim 7, wherein the maximizing the acquisition function further comprises selecting the unevaluated configuration in the selected subset having a lowest user cost.

12. A computer program product for serving a cloud workload across a plurality of cloud services, the computer program product comprising a computer-readable storage medium having program instructions embodied therewith, wherein an execution of the program instructions by a processor causes a computing device to:

perform a first evaluation of a first configuration in a first cloud service of the plurality of cloud services;

perform a second evaluation of a second configuration in a second cloud service of the plurality of cloud services;

train a probabilistic model with training data comprising first performance data and second performance data, wherein the first performance data is obtained from the performance of the first evaluation, the second performance data is obtained from the performance of the second evaluation, the first performance data comprises a first tail latency associated with the first configuration in the first cloud service, and the second performance data comprises a second tail latency associated with the second configuration in the second cloud service;

select, based on the trained probabilistic model, an unevaluated configuration in one of: the first cloud service or the second cloud service;

perform a third evaluation of the selected unevaluated configuration; and retrain the trained probabilistic model with a result of the third evaluation of the selected unevaluated configuration.

13. The computer program product of claim 12, wherein the execution of the program instructions further causes the computing device to:

select the unevaluated configuration based on performance predictions from the trained probabilistic model as inputs to an acquisition function.

14. The computer program product of claim 13, wherein the execution of the program instructions further causes the computing device to maximize the acquisition function using the performance predictions to select the unevaluated configuration.

15. The computer program product of claim 14, wherein the execution of the program instructions further causes the computing device to:

define two or more subsets of a plurality of subsets of configurations in at least one cloud service of the plurality of cloud services; and select a subset of the plurality of subsets from which to select the unevaluated configuration.

16. The computer program product of claim 15, wherein the execution of the program instructions further causes the computing device to select the unevaluated configuration in the selected subset having a lowest user cost.

17. The computer program product of claim 15, wherein the plurality of subsets is based on different hardware characteristics.

18. The computer program product of claim 17, wherein the at least one cloud service of the plurality of cloud services has a first subset based on virtual machine type and a second subset based on processor arrangement.

19. A computer system for serving a cloud workload across a plurality of cloud services, the computer system comprising:

a processor, a computer-readable memory, a computer-readable tangible storage device, and program instructions stored on the computer-readable tangible storage device for execution by the processor via the computer-readable memory, wherein the computer system is configured to perform a method, comprising:

performing a first evaluation of a first configuration in a first cloud service of the plurality of cloud services;

performing a second evaluation of a second configuration in a second cloud service of the plurality of cloud services;

training a probabilistic model with training data comprising first performance data and second performance data, wherein the first performance data is obtained from the performing of the first evaluation, the second performance data is obtained from the performing of the second evaluation, the first performance data comprises a first tail latency associated with the first configuration in the first cloud service, and the second performance data comprises a second tail latency associated with the second configuration in the second cloud service;

selecting, based on the trained probabilistic model, an unevaluated configuration in one of: the first cloud service or the second cloud service;

performing a third evaluation of the selected unevaluated configuration; and retraining the trained probabilistic model with a result of the third evaluation of the selected unevaluated configuration.

* * * * *